Nov. 9, 1965   E. KELLENBERGER   3,216,339
PHOTOGRAPHIC CAMERA
Filed Feb. 4, 1963
Fig. 1
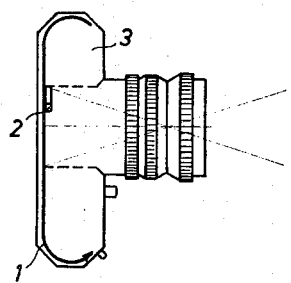
Fig. 2
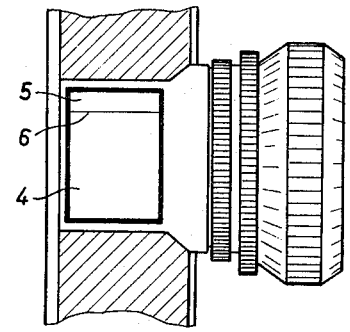
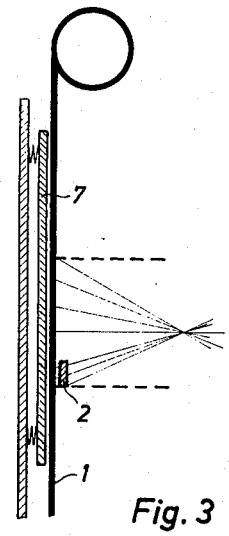
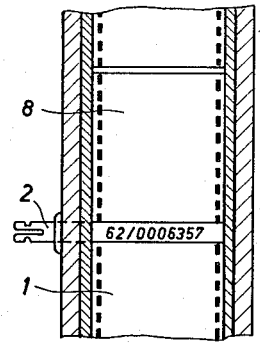
Fig. 3   Fig. 4
INVENTOR
EDWIN KELLENBERGER
By
Toulmin & Toulmin
ATTORNEYS 3,216,339
PHOTOGRAPHIC CAMERA
Edwin Kellenberger, Wienacht-Tobel, Switzerland
Filed Feb. 4, 1963, Ser. No. 256,162
Claims priority, application Germany, Feb. 7, 1962,
K 40,439
2 Claims. (Cl. 95—1.1)

The present invention relates to a photographic camera and more particularly to character recording means in a photographic camera.

Means for recording legends or characters on film have been proposed heretofore. Devices of that nature have been provided outside or inside the camera, but none of them have proved to be perfect for the intended purpose. In some cases auxiliary objectives are needed which constitute a very cumbersome device.

Accordingly, it is an object of the present invention to provide a photographic camera with a character recording device which is simple in construction, can be installed in various types of cameras and can be used for all kinds of film.

Another object of this invention is to provide legend carrying means which are positioned directly before the film to be photographically recorded thereon.

Another object of this invention is to provide character recording means which are extremely simple in use and service.

Still another object of the present invention is to avoid the use of any structure on the outside of the camera.

The invention consists in the novel combination of a character carrying slide positioned in the ray path traversing a camera body so that upon exposure of the film the characters on the slide are photographically recorded on one edge of the film. Other objects and advantages of the invention will be apparent from the following description in conjunction with the accompanying drawings, in which like reference numerals refer to like parts throughout the several figures, and wherein:

FIGURE 1 is a section of a camera showing the ray path and the arrangement of the character carrying recording slide;

FIGURE 2 is a view onto the view finder window of a reflex type camera indicating divider means provided therein which mark the field of the legend appearing on the film;

FIGURE 3 is a partial section through the camera showing the area of the film which is exposed:

FIGURE 4 is a partial view of an opened camera showing a character carrying recording slide in its inserted position.

FIGURE 1 which illustrates the ray paths entering the camera 3 further shows how the character carrying recording slide 2 is positioned between the camera lens and the film 1. The slide 2 is in juxtaposition to the film 1 and at one edge of the image field thereby allowing the light rays to traverse the slide 2 so that upon exposure of the film 1 the legend carried on the slide 2 is photographically recorded on the edge of the exposed film.

FIGURE 2 illustrates how a view finder 4 in a reflex camera employing the invention is divided by a thin divider 6 so as to enable the person looking into the viewer to distinguish between the actual image and the character receiving area 5 at one edge thereof.

FIGURE 3 shows more distinctly than FIGURE 1 how the film 1 is disposed between the film backing means 7 and the character carrying recording slide 2 so that light rays falling into the camera body through the objective traverse the slide 2 thereby allowing the legend thereon to be recorded on the film 1.

FIGURE 4 illustrates how a character carrying recording slide is in position in the camera. A slot at the edge of the image field is indicated through which the slide 2 is inserted into the camera body from the outside. As shown in FIGURE 4 the slide 2 covers the character receiving area 5 corresponding to the area 5 separated from the actual image 8 by means of the thin divider 6 (FIGURE 2).

It is obvious that different kinds of legends can be applied onto the slide 2. Deep black characters having a height of 1.5 mm. are most advantageous. As the indented outside end of the slide 2 as shown in FIGURE 4 indicates, the slides can be used as riders for index cards.

In order to avoid the entering of light into the body of the camera through the slot into which the slide 2 is inserted, resilient cap means (not shown) are preferably provided so as to make sure that extraneous light cannot possibly enter. Felt strips can also be provided inside the camera so as to guide the slide 2. These light protecting means make it possible to insert or remove a strip in daylight. Manipulation in a dark room is not necessary. It is further important that no wear results from the repeated insertion or removal of a slide.

The main advantage of the present invention resides in the fact that upon exposure of the film the desired legend is transferred photographically onto the film at the same time.

It will be understood that this invention is susceptible to further modification and, accordingly, it is desired to comprehend such modifications within this invention as may fall within the scope of the appended claims.

What is claimed is:

1. In a photographic camera for the exposure of film, the combination comprising a camera body, view finder means connected with said body, film backing means inside said body, light protected slot means leading through the wall of said body, and character carrying slide means removably disposed in juxtaposition to said film backing means and at one edge thereof, said slide means being insertable and removable through said slot, thereby allowing the characters on said slide to be photographed at one edge of the film upon exposure of the film in said camera, said view finder means having a thin line divider indicating the line inside the camera on the film dividing the field exposed and the field covered by the character carrying slide means.

2. A camera as claimed in claim 1, wherein said character carrying slide means having the outer end portion slotted to receive an index card.

References Cited by the Examiner

UNITED STATES PATENTS

| 1,240,910 | 9/17 | Wilmot | 95—1.1 |
| 1,254,590 | 1/18 | Gongaware | 95—1.1 |
| 1,304,361 | 5/19 | Oehring | 95—1.1 |
| 1,362,581 | 12/20 | Schmidt | 95—1.1 |
| 3,088,390 | 5/63 | Zimmerman | 95—36 |

NORTON ANSHER, *Primary Examiner.*

JOHN M. HORAN, *Examiner.*